United States Patent
Darby et al.

[11] Patent Number: 5,960,524
[45] Date of Patent: Oct. 5, 1999

[54] BURIAL CONTAINER ASSEMBLY AND METHOD FOR CONSTRUCTING THE SAME

[75] Inventors: James W. Darby; James Walthall, both of Danville, Ill.

[73] Assignee: Greenwood, Inc., Danville, Ill.

[21] Appl. No.: 08/881,979

[22] Filed: Jun. 25, 1997

[51] Int. Cl.$^6$ ............................................. A61G 17/00
[52] U.S. Cl. .................... 27/35; 27/3; 27/10; 52/141; 52/142
[58] Field of Search .................... 27/1, 2, 3, 10, 27/35; 52/128, 135, 139, 140, 141, 142, 309.9

[56] References Cited

U.S. PATENT DOCUMENTS

| | | |
|---|---|---|
| Re. 29,114 | 1/1977 | McQuestion . |
| 3,406,229 | 10/1968 | Cenegy ...................................... 27/3 X |
| 3,541,747 | 11/1970 | Olson et al. ............................... 27/3 X |
| 3,732,602 | 5/1973 | Vigh ............................................... 27/1 |
| 3,839,768 | 10/1974 | McQuestion . |
| 4,059,127 | 11/1977 | Olson . |
| 4,143,494 | 3/1979 | Abbate . |
| 4,154,031 | 5/1979 | Williamson, Jr. . |
| 4,253,220 | 3/1981 | Work . |
| 4,314,390 | 2/1982 | Darby et al. ........................... 52/135 X |
| 4,315,353 | 2/1982 | Sorensen . |
| 4,387,491 | 6/1983 | Schaaf et al. . |
| 4,463,484 | 8/1984 | Valle Arizpe . |
| 4,845,906 | 7/1989 | Turpin . |
| 4,961,293 | 10/1990 | House et al. . |
| 5,121,529 | 6/1992 | McClure . |
| 5,245,733 | 9/1993 | Goria . |
| 5,261,199 | 11/1993 | Schmidt . |
| 5,321,873 | 6/1994 | Goria ........................................... 27/35 |
| 5,471,718 | 12/1995 | Harrill . |
| 5,526,616 | 6/1996 | Bamberg . |
| 5,611,125 | 3/1997 | Williams et al. . |

*Primary Examiner*—Terry Lee Melius
*Assistant Examiner*—William L. Miller
*Attorney, Agent, or Firm*—Gifford, Krass, Groh, Sprinkle, Anderson & Citkowski, P.C.

[57] ABSTRACT

A burial container assembly with a lid constructed of a top and a plurality of sides extending from the top and which defines a first shell having a hollowed interior and a downwardly facing perimeter edge. A base is likewise provided with a bottom and both side walls and end walls which extend from the bottom to establish an open interior and an upwardly facing perimeter edge and which in combination define a second shell with a likewise hollowed interior. The base is preferably provided as a rectangular shaped body with an outwardly extending ledge projecting around a perimeter of the body and around which are assembled a plurality of individual side/end pieces and corner pieces to establish the hollowed shell of the base. Both the base and lid are capable of being filled with a foam filler material to greatly increase the load bearing and force resistive capabilities of the burial container assembly and the base and lid are further provided with a unique configuration of negative impressions along its surfaces which facilitate the location and fixed engagement within the surrounding earth. A method of assembling a burial container is also disclosed and facilitates ease of transportation and assembly of the assembly.

12 Claims, 9 Drawing Sheets

Fig-1

IFig-2

BURIAL CONTAINER ASSEMBLY AND METHOD FOR CONSTRUCTING THE SAME

BACKGROUND OF THE INVENTION

1. Field of the Invention

The present invention relates generally to burial vault and casket constructions and, more particularly, to a lightweight burial container assembly which is constructed of a plurality of individual and assembleable pieces and which is filled with a desired filler material to provide improved load bearing capability. A method for constructing a burial container which employs the assembly of the invention is also disclosed.

2. Description of the Prior Art

The prior art is well documented with examples of burial vaults and burial vault/casket constructions. The more traditional of such constructions has consisted of a burial casket constructed of either a wood or a polymer or other synthetic material which is used for holding the body of the deceased and, upon burying of the deceased, is placed within a two-piece concrete vault enclosure. As is well understood in the art, the drawbacks of such constructions include not only the overall expense of both the vault and casket but the size and weight considerations involved, particularly with the burial vaults which can easily weigh more than 2400 pounds including the base and lid. A further disadvantage endemic with standard sized vault enclosures is the inevitability of cracks and seams which result in water seepage within the vault enclosure, such seepage typically resulting in the entire vault being filled with water and the water subsequently unseating the casket from its anchored position and permeating through the casket to the body contained within. Another disadvantage of current burial casket designs, especially those designated as combination vault and casket constructions and employed without the provision of a surrounding vault enclosure, is the tendency of the ground conditions which may change or shift over time, with the result that the combination assembly will rotate and pivot within the ground, and the result being the eventual compromising of the seal integrity of the vault/casket.

Recent attempts in the prior art have been made to improve upon the most conventional of burial construction assemblies, both in the areas of weight reduction and simplified design. U.S. Pat. No. 5,245,733, issued to Goria, teaches a combination burial vault and casket in which both the lid and base are constructed of a synthetic resinous material of one piece and seamless construction. Both the lid and base are constructed with composite hollow walled interiors and which are capable of being filled at the grave site with either a concrete or pumpable light-weight cellular concrete for added strength. The lid and base are configured so that they may be engaged by mechanical means, such as vertically securing bolts or by chemical means. Although the combination vault and casket construction of Goria does provide significant weight reductions over the prior art, it still suffers a realistic shortcoming of the relative bulkiness of the base and lids and the shipping requirements which are necessary to transport the one-piece lid and base to the gravesite.

An additional example of the prior art is illustrated in Reissue U.S. Pat. No. 29,114, issued to McQuestion, which discloses a burial vault construction having a preformed hollow fiberglass resin base and cover shell with increased tensile strength and crack-resistance. The inner surface of the shells are provided integrally formed fiberglass anchor loops which become embedded within and facilitate gripping of a fillable cement sand-stone composition. Additional short steel wires may be placed randomly within the fillable composition to increase strength and tensile resistance. McQuestion is similar in respects to Goria in that, while it too improves upon the weight consideration of the vault design, the base and lid must again be transported in one-piece fashion and McQuestion further requires a fairly elaborate assembly of the shells to provide the requisite tensile load bearing characteristics.

SUMMARY OF THE PRESENT INVENTION

The present invention is a burial container assembly and, specifically, a combination vault and casket assembly having a base which, in a preferred embodiment, is constructed of a plurality of individually transportable and on-site assembleable pieces and the base and shell are further provided with hollowed interiors capable of being filled with a filler material to increase dramatically increase the strength and load bearing capabilities of the assembly and without a significant increase in the overall weight of the assembly.

The lid is constructed with a top and a plurality of sides extending from the top to define in combination a first downwardly facing perimeter edge and is constructed as a first hollow interior shell with an inner layer and a spaced apart outer layer, a portion of the top is capable of being either releasably securable or removed completely to expose the first hollow interior shell. The base is likewise constructed with a bottom, side walls and end walls which extend from the bottom to define in combination a second upwardly facing perimeter edge surrounding an open interior. The base is constructed as a second hollow interior shell with an inner layer and a spaced apart outer layer which defines the second hollowed interior and which is accessible from a perimeter surrounding the bottom.

The first and second hollowed interiors are each fillable with a filler material which, according to a preferred embodiment, is a plasticized foam which is impregnated with a sand, gravel or flux composition which replaces the more standardized concrete fillers used in the prior art and which serves to greatly increase the durability and load bearing capabilities of the assembly while decreasing its overall weight. A nozzle or gun is provided which feeds the filler material from a supply through a hose or feed line and into the hollowed interiors of the base and lid. The portion of the top which is releasably secured, or already open, is removed in a first filling step of the lid to permit the foamable composition to be filled.

The inner layer of the base is provided as a solid rectangular shaped body which defines the open interior and which further includes an outwardly projecting ledge which extends from an upper portion of the body and around its circumference. The outer layer of the base is provided by a plurality of individual and end-to-end attachable planar shaped side/end pieces and corner pieces which, upon assembly, are secured to the outwardly projecting ledge of the inner layer in encircling fashion to establish the second hollowed interior which is accessible from an open bottom perimeter of the bottom. The side/end pieces and corner pieces are attachable both to each other and to the outwardly projecting ledge of the inner base layer by either a glue adhesion material or, as is also disclosed, by provision of a plurality of strips of two-sided adhesive tape. Upon assembly, the base may be inverted to an upside down position, upon which the second hollowed interior is filled with the foamable and impregnated material.

The advantage of providing the base in a breakdown assembly is appreciated when considering the savings in transport provided both by reduced size of the assembly in shipping as well as a reduction in its weight which translates into considerable dollar savings. A further advantage is evident from the ability to fill the lid and base with the foamable filler composition either at the vault production facility or the gravesite in both a quick and efficient manner. The present invention also discloses a method of assembling a burial container which discloses the steps of filling the first hollowed interior of the lid with a foamable composition, assembling the individual side/end pieces and corner pieces around the inner layer of the base, and inverting the base to fill the second hollowed interior.

BRIEF DESCRIPTION OF THE DRAWINGS

Reference will now be made to the attached drawings, when read in combination with the following specification, wherein like reference numerals refer to like parts throughout the several views, and in which.

DESCRIPTION OF THE PREFERRED EMBODIMENTS

Figure 1:
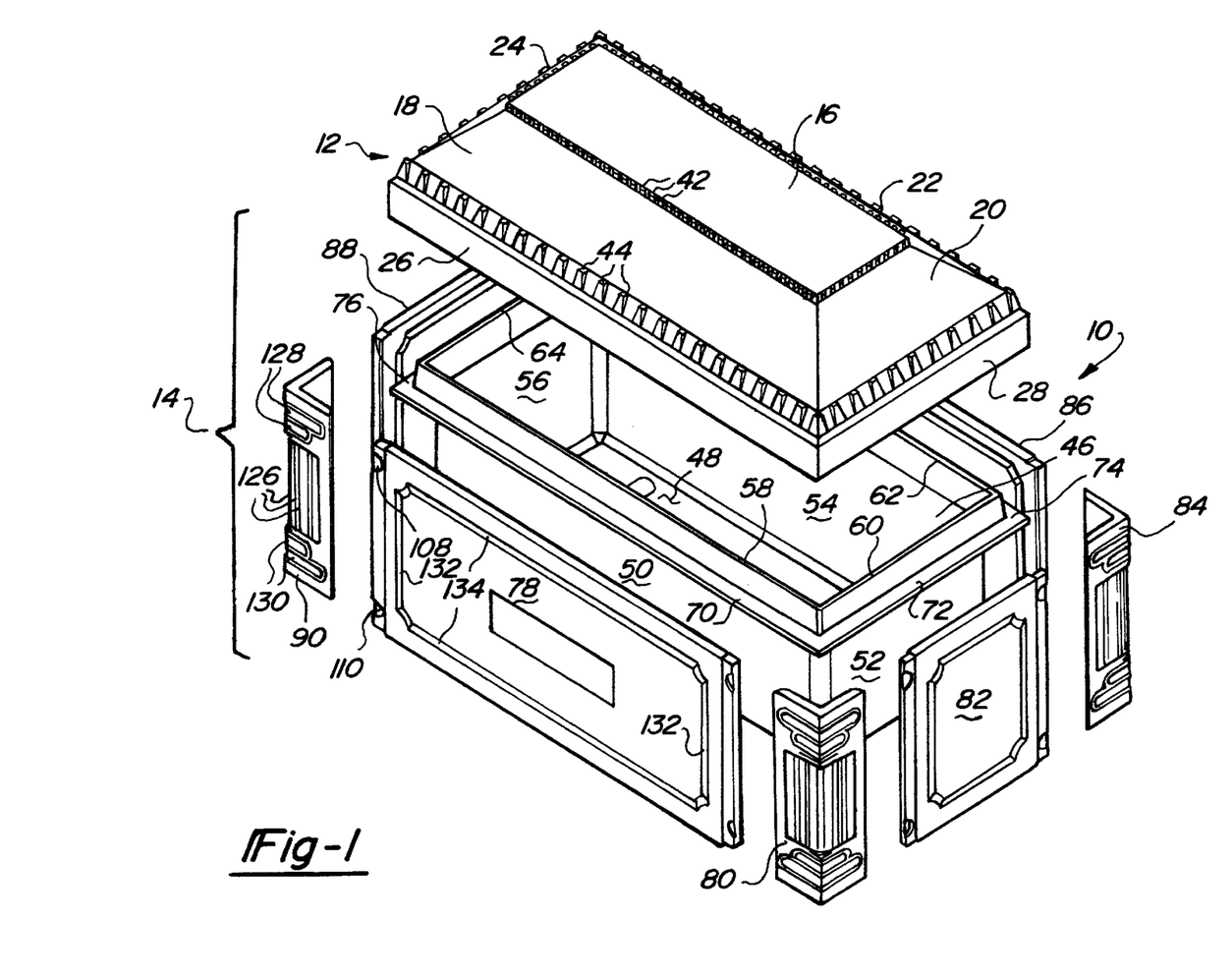
FIG. 1 is an exploded view of the burial container assembly according to the present invention.
Figure 2:
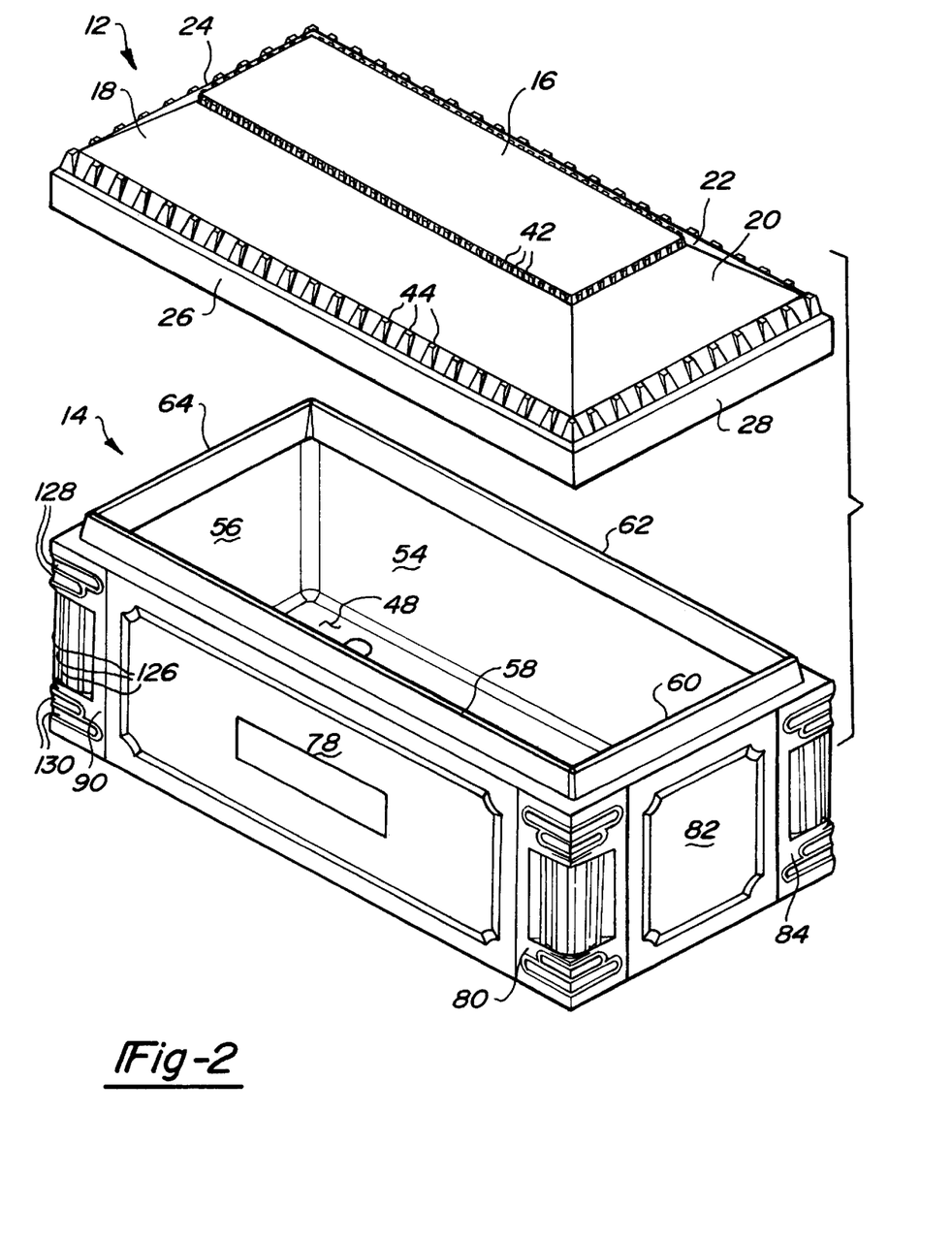
FIG. 2 is a partially exploded view similar to that illustrated in FIG. 1 and further illustrating the plurality of individual side/end pieces and corner pieces of the base in an assembled state according to the present invention.
Figure 3:
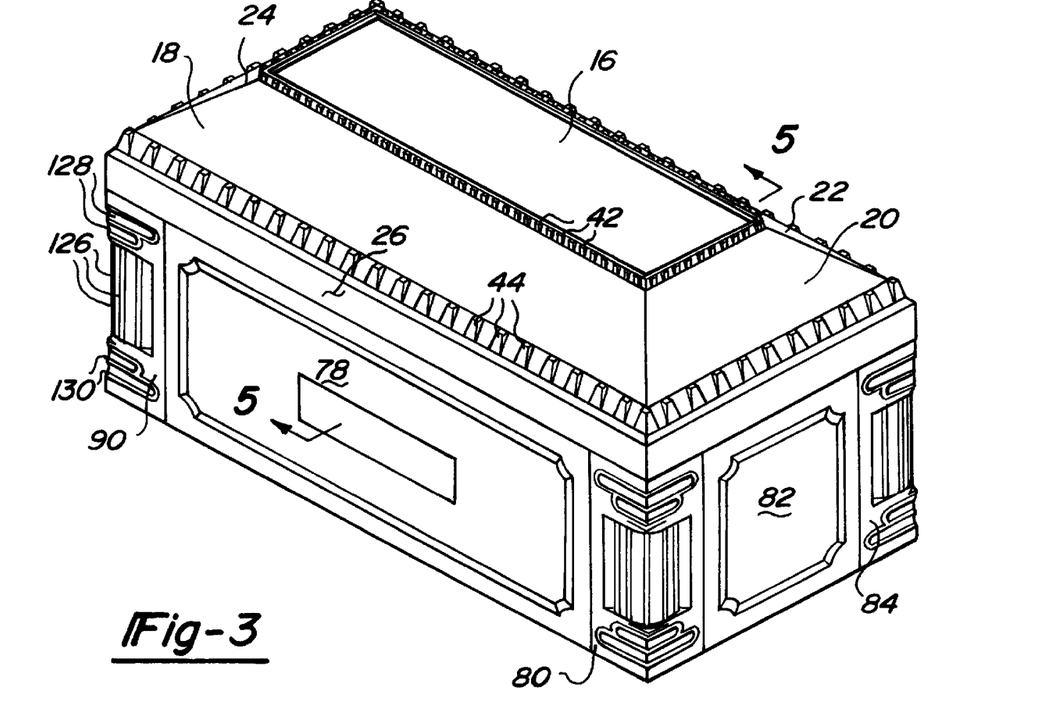
FIG. 3 is a perspective view illustrating the base and lid of the burial container in an assembled state according to the present invention.
Figure 4:
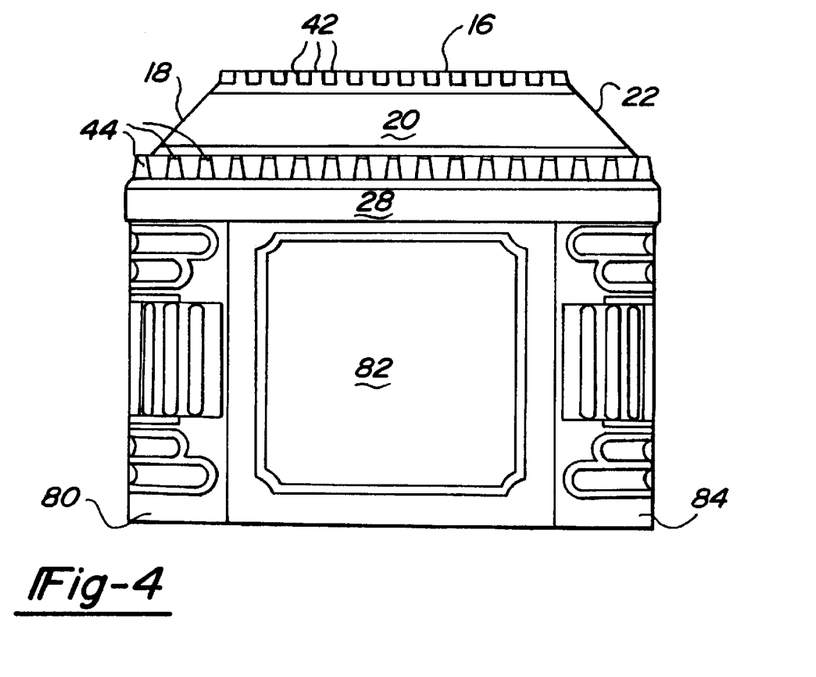
FIG. 4 is an end view of the burial container illustrated in FIG. 3 and further showing the configuration of the negative impressions along the sides and top of the container which facilitate locating and fixed positioning within the ground.

Referring to FIG. 1, an exploded view of a burial container assembly is shown at 10 according to the present invention and generally includes a lid 12 and a base 14 consisting of a plurality of exploded and arrayed components. The lid 12 and base 14 are preferably constructed of a durable and high-strength plastic or polymer composition which will not decay over a long period of time within the grave and which further exhibits a high degree of load resisting and load bearing capabilities when assembled together and buried in the ground.

Figure 5:
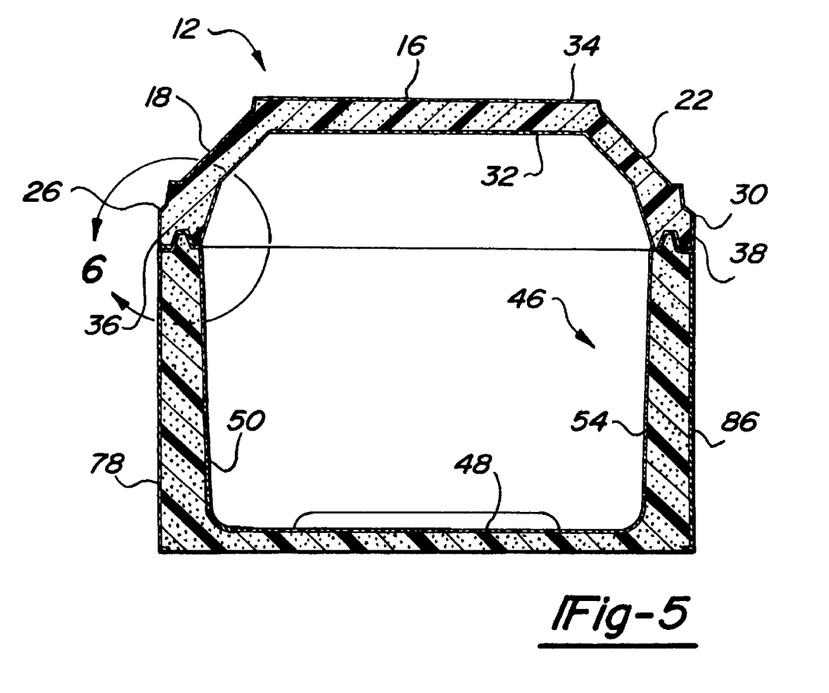
FIG. 5 is a cutaway view taken along line 5—5 of FIG. 4 and showing in cross section the first and second hollowed interiors of the base and lid within which is held the foamable filler composition.

The lid is constructed with a substantially flat and planar top 16, and is preferably rectangular in shape with a first side 18, a second end side 20, a third side 22 and a fourth end side 24 which all extend from the top 16 in a downwardly and angular fashion. The first side 18, second side 20, third side 22 and fourth side 24 all terminate in interconnected and substantially vertically arrayed lower portions, illustrated in FIG. 1 as lower portion 26 extending from side 18 and lower portion 28 extending from side 20. FIG. 5 also shows a lower portion 30 extending from side 22.

As is best illustrated in FIG. 5, the lid 12 is shown in cross sectional cutaway and includes an inner layer 32 and a spaced apart outer layer 34 which form a first internally hollowed shell extending along the top 16, the sides 18, 20, 22 and 24 and downwardly along the interconnected and vertically arrayed lower portions by which each side terminates in a downwardly facing direction. The vertically arrayed lower portions of the sides 18, 20, 22 and 24 establish, in combination, a first downwardly facing perimeter edge, shown at 36 for side 18 and at 38 for side 30 in FIG. 5. As is further illustrated in the expanded view of FIG. 6, the portion of the first downwardly facing perimeter edge 32 for the side 26 includes a downwardly extending outer layer 34 and an outwardly angularly extending inner layer 32 which establish a flat bottom surface 38. Formed within the flat bottom surface 38 in a generally centralized location is a recessed channel configuration 40 with angled side walls and an interconnecting base wall and which, in combination with the flat bottom surface 38, provides a first engaging surface for the downwardly facing perimeter edge of the lid 12.

As is also best shown throughout the various figures, and most particularly FIGS. 1, 2, 3 and 9, the lid 12 is further provided with a first layer of upper spaced apart projections 42 extending around a top surface and a second layer of enlarged and spaced apart projections 44 extending around the lid at a lower and outwardly spaced location corresponding to the juncture between the sides 18, 20, 22 and 24 and the downwardly arrayed lower portions (again illustrated at 26, 28 and 30 for sides 18, 20 and 22). The spaced projections 42 and 44 are disposed in substantially horizontal fashion at the upper and lower locations and along the four sides of the lid 12 for the purpose of increasing the surface area of the burial container assembly which contacts the surrounding earth and to thus contribute to increased fixed location of the container assembly within the ground as will be subsequently described.

Referring again to FIG. 1, the base 14 includes a rectangular shaped body 46 having a bottom 48 from which extends upwardly in combination a first side 50, a second side 52, a third side 54 and a fourth side 56 to define an open interior and within which either human remains (not shown) or a remains held within some other form of intermediate enclosure (perhaps another type of insertable casket also not shown) is insertable. Upper edges of the first 50, second 52, third 54 and fourth 56 sides define in combination a second upwardly facing and perimeter edge of the base 14. Specifically, the upwardly facing perimeter edge is defined by sides 58, 60, 62 and 64 which correspond to the sides 50, 52, 54 and 56, respectively. Referring again to the enlarged view of FIG. 6, the upwardly facing perimeter edge 58 associated with side 50 of the rectangular shaped body 46 is illustrated in operative engagement with the recessed channel configuration 40 of the associated side 18 and downwardly extending portion 26 of the lid 12 and includes a projecting configuration which extends in a generally centralized location above a flat upper and inner surface 66 and which matches the recessed configuration 40 of the first downwardly extending perimeter edge. In this fashion, the lid 12 is capable of being secured to the base 14 by means of an adhesive such as a butyl based gasket 68 which is applied between the recessed configuration of the first downwardly facing perimeter edge and the projecting configuration of the second upwardly facing perimeter edge. The adhesive 68 may be of a type conventionally used in the mortuary art and, alternatively, the adhesive may be provided as a dual-sided adhesive tape.

Figure 6:
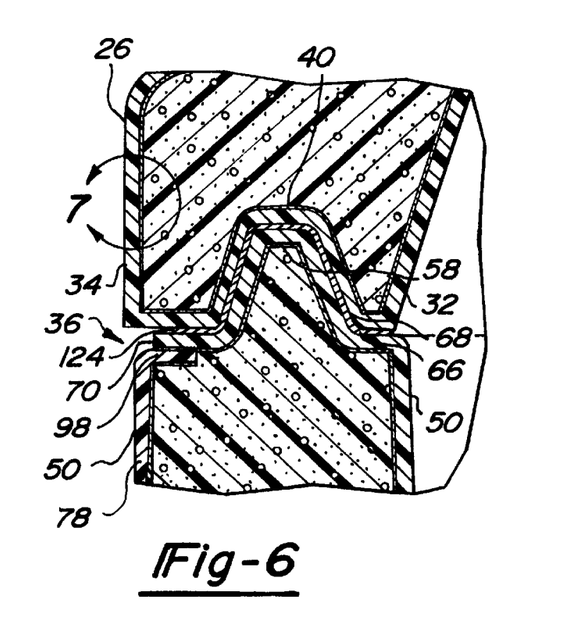
FIG. 6 is an enlarged view of the first downwardly facing and second upwardly facing perimeter edges of the lid and base in an engaged position and further illustrating the two-sided adhesive tape according to a preferred embodiment for securing the base and lid together.

The rectangular shaped body 46 also includes outwardly projecting ledge portions extending along each of the sides. As best seen in FIG. 1, a first projecting ledge portion 70 extends outwardly from an upper portion of the first side 50, a second ledge portion 72 extends from second side 52, a third projecting ledge portion 74 extends from third side 54 and a fourth projecting ledge portion 76 extends from fourth side 56. The projecting ledge portions 70, 72, 74 and 76 are interconnected around a periphery of the rectangular base 46 and display upper faces for providing abutting support with the interengaging portions of the downwardly facing perimeter edges of the lid, as best shown in FIG. 6, and outer edges for facilitating assembly of the base as will be subsequently described.

Referring again to FIG. 1, a plurality of individual and assembleable pieces are provided for installation around the rectangular shaped body 46 and include a first planar shaped side piece 78 corresponding to first side 50, a first corner piece 80, a second planar shaped end piece 82 corresponding to side 52, a second corner piece 84, a third planar shaped side piece 86 corresponding to side 54, a third corner piece (hidden from view), a fourth planar shaped end piece 88 corresponding to side 56 and a fourth corner piece 90. The individual and assembleable pieces are arrayed around the rectangular shaped body 46 and, upon subsequent assembly, provide the base with a second shell construction in which the sides of the body form inner surfaces and the assembleable pieces outwardly spaced surfaces.

Figure 8:
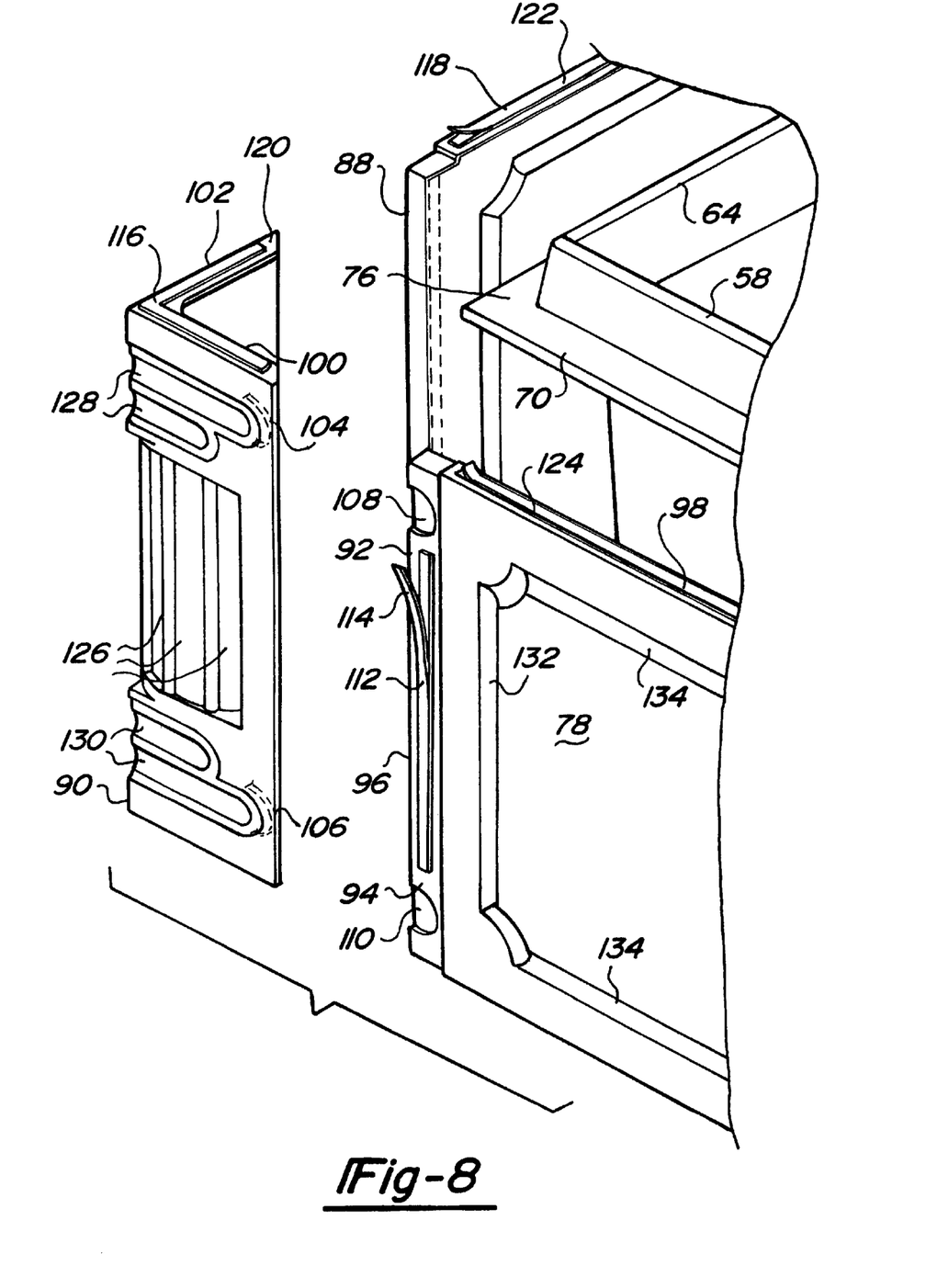
FIG. 8 is an exploded view of a corner of the assembleable base illustrated in FIG. 1 and further showing the dual-sided adhesive tape for attaching the side/end pieces and corner pieces both together in end-to-end fashion as well as to the outwardly projecting ledge of the base.

Referring to FIG. 8, an enlarged view is shown of the assembly of the fourth end piece 88, fourth corner piece 90 and first side piece 78 to their associated sides of the body 46 and its outwardly projecting ledge portions. The assembly of the side piece 78, end piece 88 and corner piece 90 to the rectangular shaped body 46 is exemplary of the construction of all the assembleable pieces which make up the outer shell layer. The first planar shaped side piece 78 is provided with a vertically extending corner edge portion 92 having an outer face 94 and an edge face 96 and further having a top edge 98.

The fourth corner piece 90 includes a first angled side 100 and a second angled side 102. As is best illustrated from the first angled side 100, an upper interlocking guide portion 104 and a lower interlocking guide portion 106 are illustrated in phantom and extend from an inner surface of the corner piece 90 in opposing fashion to the first side piece 78. A pair of corresponding receiving portions 108 and 110 are formed in recess fashion along the outer face 94 of the vertically extending corner edge portion 92 as is a first strip of a two-sided adhesive tape 112. In a first assembling step, a paper backing 114 of the adhesive tape 112 is removed from the side piece 78 and the associated angled side 100 of the corner piece 90 is engaged over the corner edge portion 92 so that the interlocking guide portions 104 and 106 are located within the receiving portions 108 and 110 and the exposed face of the applied adhesive tape 112 adhesively secures the inner face of the first angled side 100. Although not illustrated clearly in FIG. 8, similar elements are provided between the second angled side 102 of the corner piece 90 and associated outwardly facing side edge of end piece 88 (not shown) for engaging the corner piece 90 to the end piece 88. Additional strips of adhesive tape 116 and 118 are provided on upper facing edges 120 and 122 of the corner piece 90 and end piece 88, respectively and, in combination with an adhesive strip 124 placed upon the upper edge 98 of first side 78, are applied to corresponding underside surfaces of the outwardly projecting ledge to secure the assembleable pieces in spaced apart fashion from the associated sides which make up the rectangular shaped body 46.

As is specifically illustrated in the enlarged view of FIG. 6, the adhesive strip 124 secures the inwardly facing upper edge 98 of the associated side piece 78 to the underside of the outwardly projecting ledge portion 70 associated with the first side 50 of the rectangular shaped body 46. In this manner, the second hollowed shell of the base 14 is created by the affixing of the assembleable pieces around the periphery of the rectangular shaped body 46 so that the sides 50, 52, 54 and 56 of the rectangular body 46 form the inner layer of the second shell and the assembleable sides 78 and 86, ends 82 and 88, and four corners (illustrated by corners 80, 84 and 90) in combination form the spaced apart outer layer. The arrangement of the spaced apart inner and outer layers of the lower base shell is also illustrated in the cutaway view of FIG. 5 and shows the inner sides 50 and 54 of the rectangular body 46 positioned relative to the assembled outer sides 78 and 86. The assembled side, end and corner pieces are also such that the second hollowed interior of the base shell is accessible from an open perimeter extending around the bottom of the base and which is defined by the outwardly facing surfaces of the inner layer sides and the inwardly facing surfaces of the spaced apart outer sides which are securable attached at their upper ends to the associated undersides of the outwardly projecting ledge.

An additional unique feature of the burial container assembly of the present invention has to do with the negative impressions which are formed at key locations along the lid 12 and base 14 and which, upon completed construction and burial of the container assembly, contribute to fixed and immovable location of the container assembly within the surrounding earth by increasing the surface area of contact presented by the lid and base. Also, as will be subsequently discussed, the projections in the interior of the lid and base which correspond to the impressions along the exterior surface also contribute to gripping and location of the foamable filler material. Specifically, pluralities of negative impressions are established within the four corner pieces and serve to assist in immovably locating the burial container and allowing loading by the surrounding earth to provide additional ballast to the casket/vault assembly. The four corner pieces are identically configured and, referring to the corner piece 90 illustrated in FIG. 8, a first series of recess channel impressions 126 are formed in vertically extending and spaced apart curvilinear fashion along the corner piece 90. Additional series of upper 128 and lower 130 recess channel impressions are also formed in substantially horizontally extending fashion and proximate to upper and lower ends of the corner piece 90.

The upper and lower channel impressions 128 and 130 extend along the perpendicular facing outer surfaces of the angled sides 100 and 102 and, in combination with the vertically extending recess channel impressions 126, significantly contribute to the effective overall surface area of the corner piece 90 which contacts the surrounding earth after burial. The corresponding vertical extending negative impressions and upper and lower recess channel impressions formed within the identically configured remaining three corner pieces are likewise evident throughout the illustrations and are therefore not shown for ease of illustration. Referring still to FIG. 8, additional negative impressions are provided in the form of interconnected vertically 132 and horizontally 134 extending recess channels which are provided along the outer face of the first assembleable side piece 78 in proximity to its outer perimeter. As is again well illustrated throughout the drawings, additional vertical and horizontal extending recess channels are formed around the outwardly facing sides of all the side and end pieces and, in combination with the negative impressions in the corner pieces, significantly increase the available interengaging exterior surface area of the burial container for fixedly positioning the assembled container in a level manner within the ground.

Figure 9:
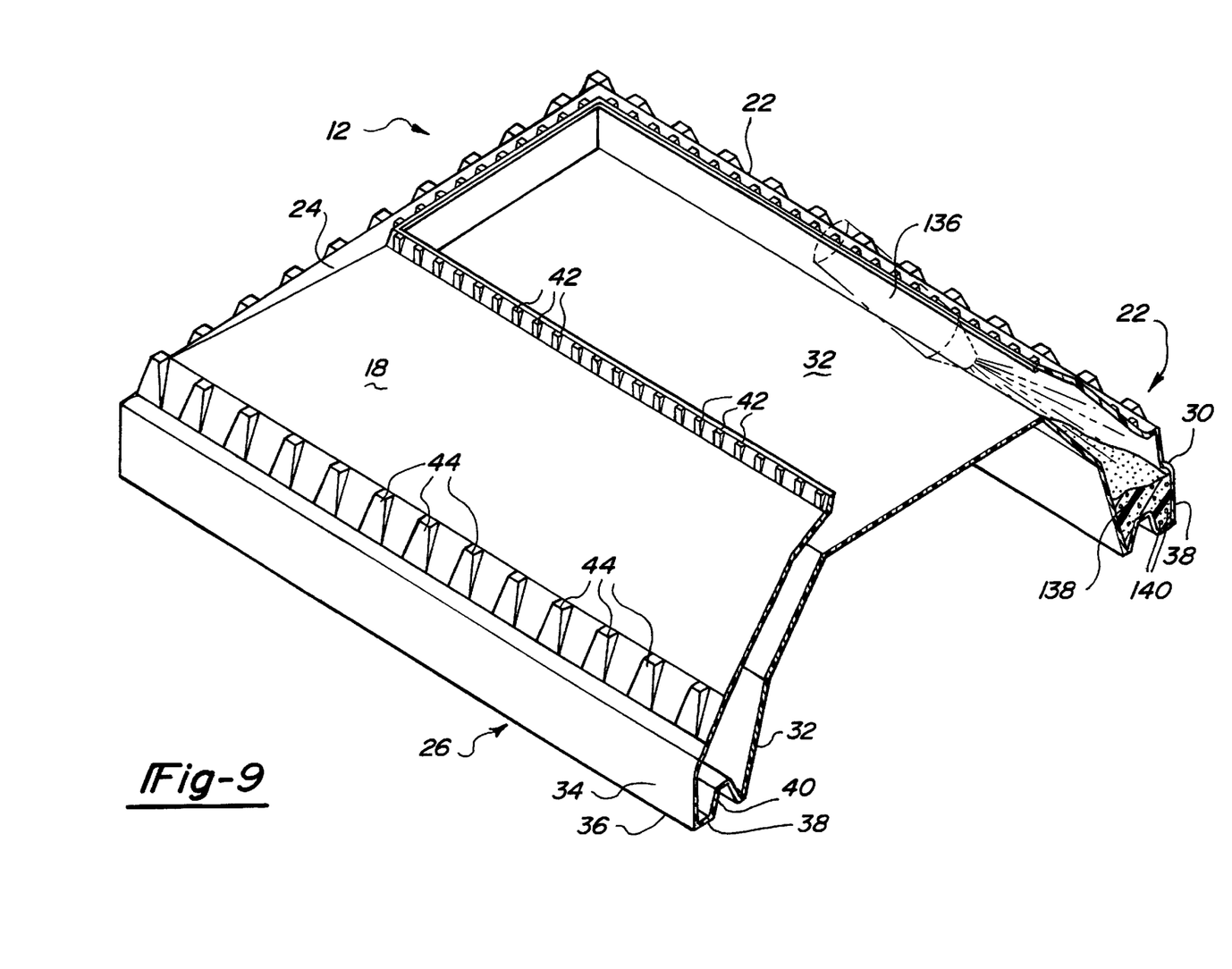
FIG. 9 is a cutaway view of the lid which exposes the first hollowed interior and further illustrates the application of a foamable filler composition within the hollowed interior.
Figure 10:
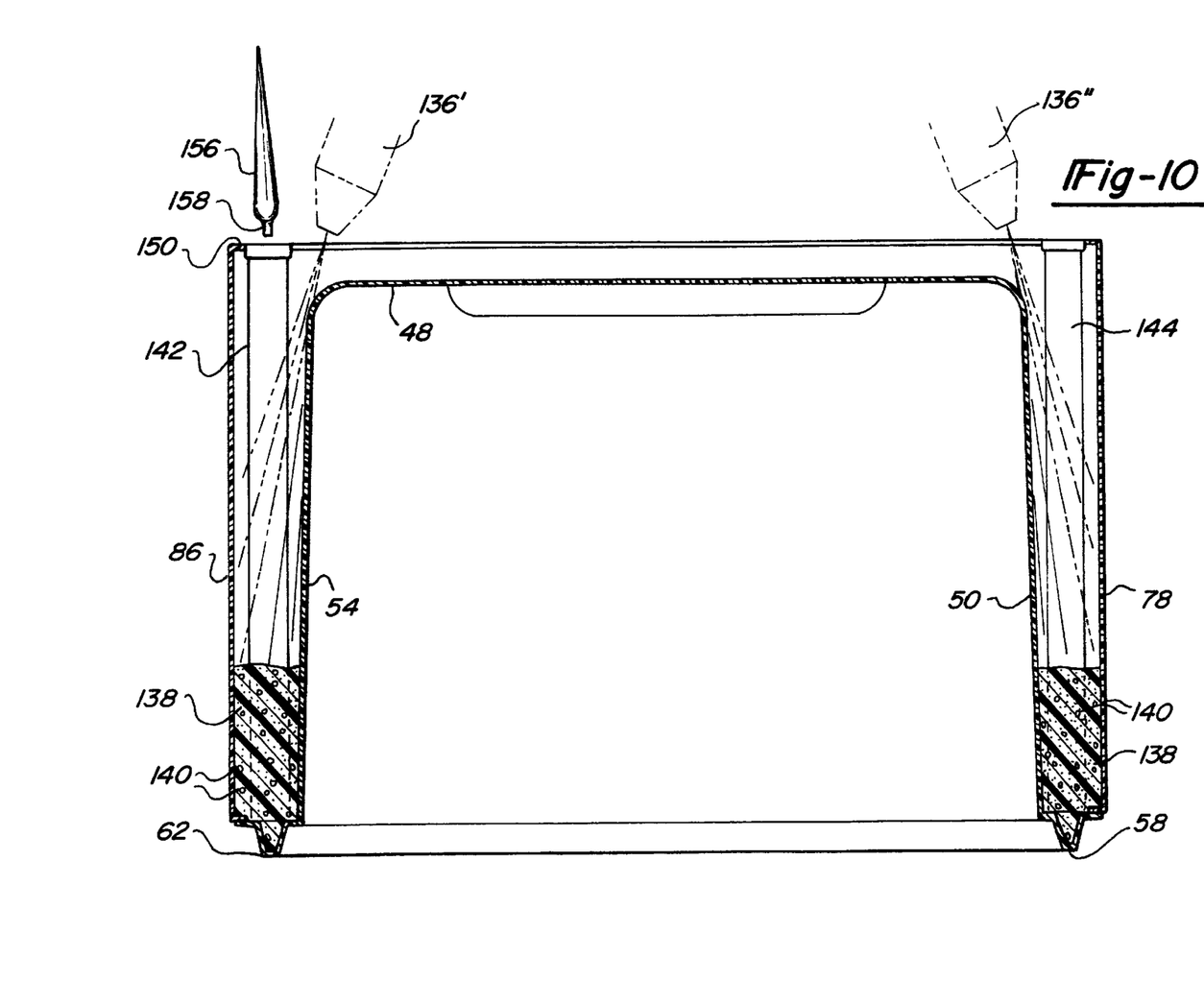
FIG. 10 is a side view in cutaway of the assembled base in an inverted position and illustrating the ability to fill the second hollowed interior with the foamable filler composition.

Referring now to FIGS. 9 and 10, the further assembly steps of filling the first and second hollowed shells of the lid and base with a foamable filler material will now be described. With reference first to FIG. 9, the lid 12 is illustrated in cutaway with the planar top portion 16 removed and the first shell interior exposed. An application nozzle or gun of conventional design, illustrated at 136, is provided and communicates a foamable, preferably plasticized, composition 138 within the open interior defined by the first shell. The foamable composition 138 is such that it is relatively light in weight, yet adds significant load and weight bearing capability to the burial container assembly in use. The foamable composition is further preferably impregnated with a granular or aggregate additive 140, which can be selected from a group including a sand, gravel or other flux type particulate which is mixed within the foamable composition 138 and which adds a selected degree of desired and added weight to the composition and facilitates bonding with the inwardly facing surfaces of the first shell.

Figure 7:
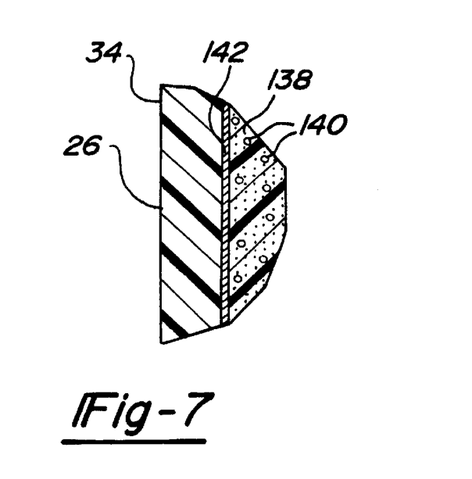
FIG. 7 is an enlarged view of a representative portion of an interior adhesive layer which is applied to the inner facing surfaces of the base and lid which establish the first and second hollow interiors and which facilitate adhesion and even filling of the interiors by the foamable composition.

Referring again to FIG. 7, an enlarged portion is illustrated in cutaway of the boundary connection between a selected location of the lid 12, specifically a portion of the outer layer 34 at the location of the downwardly extending side portion 26, and the foamable filler composition 138 and impregnated particulate aggregate 140. A glue adhesive sheet 142 is illustrated which is applied to the inwardly facing surface of the outer layer 34 and, in operation during filling of the foamable material and aggregate, assists in the even spreading and adhesion of the filler material throughout the interior of the shell formed within the lid. Additional sheets of glue adhesive material are also applied throughout the inwardly and outwardly facing surfaces of the outer and inner layers of both the lid and the base for the purpose of assisting in even and complete filling of the foamable material and further assist in preventing the foamable material from settling within the shell interiors during drying and hardening.

Referring again to FIG. 9, it is envisioned that the top 16 of the lid may either be reattached after completed filling of the foamable material 138 within the first hollowed interior by means such as additional adhesive strips or glue (not shown). Alternatively, the top 16 may be intentionally left open for the purpose of intentionally permitting the surrounding earth to contact the foamable filled material and aggregate at the upper face of the lid 12 and in this instance can actually improve fixed and static location of the burial container by introducing a leveling aspect of the surrounding earth pressing down against the open top of the lid which complements those established by the alternating projections 42 and 44 of the top and further by the negative impressions formed in the sides and corners of the base to assist in retaining the burial container in a level and immovable manner within the ground. The configuration of the top of the lid is of a substantial "pan" shape and, in effect, causes the earth above the assembly to function also as ballast to assist in immobilizing the assembly.

Referring now to FIG. 10, the assembled base 14 is illustrated in an inverted position in which the open perimeter surrounding the bottom is easily accessible and a pair of nozzle portions 136' and 136" are arrayed for filling the second hollowed interior with an additional volume of foamable filled material 138 and impregnated aggregate 140. As was previously explained with the first hollowed interior of the lid, the filler material is applied until the second open shell defined by the second hollowed interior is completely filled to the edge of the inverted bottom. In this manner, additional upwardly engaging forces applied by the surrounding earth underneath the base will provide biasing against the underside of the base and will effectively counteract those applied from the sides and above the burial container assembly to statically immobilize the assembly within the ground, even in the instance of ever shifting earth which for other assemblies would cause both tilting and compromise of the sealing integrity of the containers.

Figure 11:
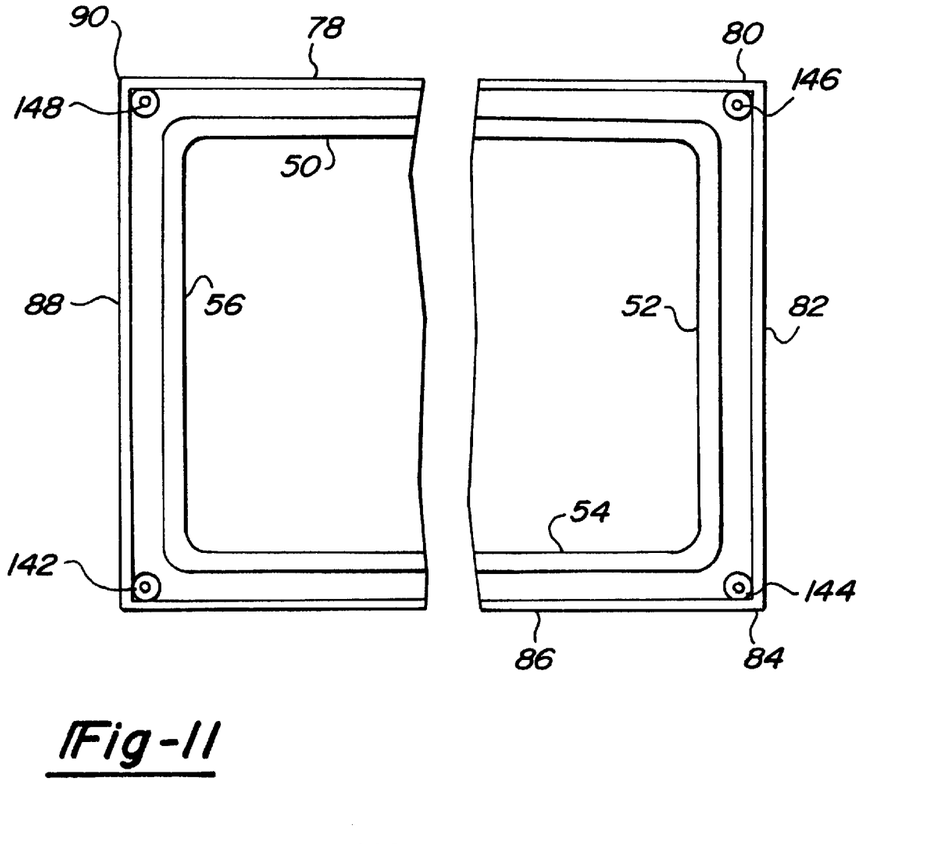
FIG. 11 is bottom view of the assembled base, in reduced length for ease of presentation, and again showing the perimeter which defines the second hollowed interior as well as the plurality of vertically extending ballast tubes for receiving specified volumes of ground water within the vault assembly to increase its weight mounted within the grave excavation.
Figure 12:
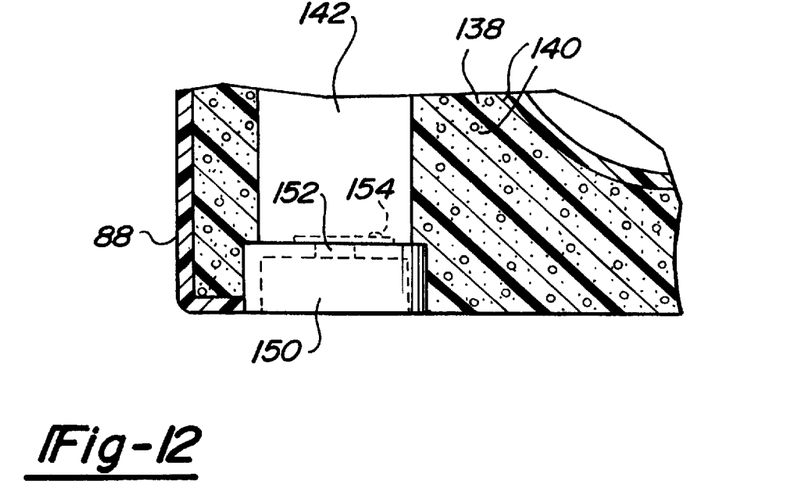
FIG. 12 is an enlarged view a bottom facing portion of a selected ballast tube which includes a foot valve for facilitating one-way inflow of ground water.

Referring again to FIG. 10, in combination with FIGS. 11 and 12, a series of vertically extending water ballast tubes are located within the open surrounding bottom perimeter of the base and extend within the second hollowed interior. Specifically, the ballast tubes are identified at 142, 144, 146 and 148 and are each proximately located at a respective corner of the rectangular shaped hollowed interior as best illustrated in the underside view of FIG. 11. As is further best illustrated in the enlarged fractional view of FIG. 12, the selected ballast tube 142 includes an enlarged and hollowed end 150 which is proximate the bottom facing surface of the base and within which is located a reduced diameter recessed inner portion 152 and a foot valve. The purpose of the ballast tubes is to facilitate one-way inflow of water through the foot valves, the volumes of ballast at the four edges contributing to the immovable support of the assembly. In this manner, the burial container may be additionally securably anchored over time by taking advantage of the present ground water surrounding the assembly.

Figure 13:
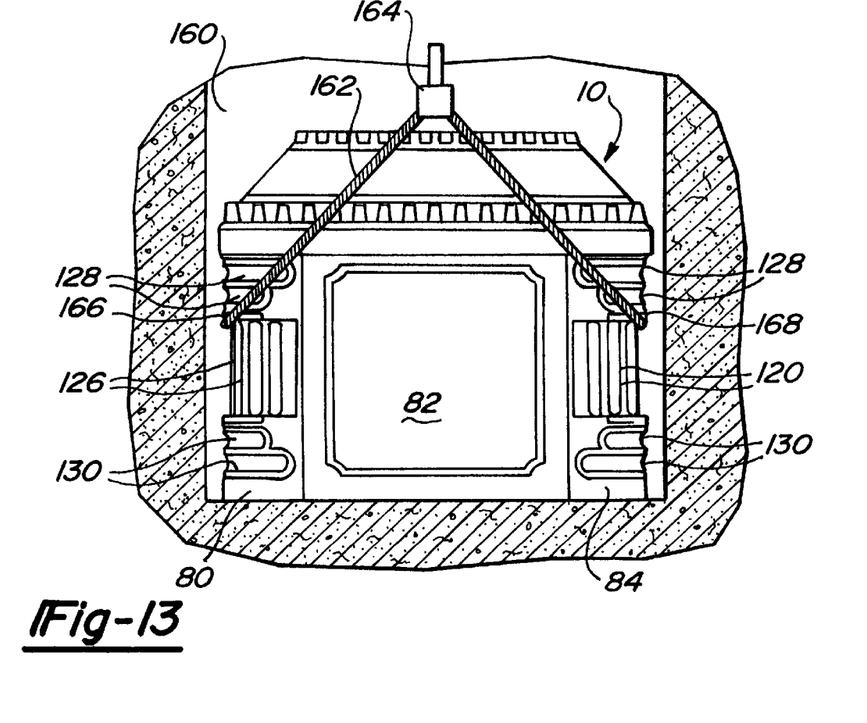
FIG. 13 is an environmental end view illustrating a plurality of corner ledges provided by the negative impressions in the burial container base which permit the burial container to be lowered by a cable within a grave excavation in a first burial stage.

Referring to FIG. 13, an operative end view of the assembled burial container assembly 10 being lowered into a burial excavation 160 is illustrated and includes a cable 162 supported at upper end by a pulley or block and tackle 164 which extends to engage the sides of the base. The corner pieces of the assembled outer layer of the base are constructed so that they provide an additional retaining ledge for permitting the assembled container to be hoisted by such a rope or cable extending from a crane (not shown). The corner pieces 80 and 84 are illustrated in the end view of FIG. 13 and the corner piece 80 includes a retaining ledge 166 formed at a location between the negative impressions 126 and 128 as previously described in corresponding corner piece 90 and the corner piece 84 likewise includes an identically configured retaining ledge 168. The construction of the corner pieces is therefore such that they not only greatly increase the opposing surface area of the burial container base but that they also facilitate easy transference of the assembled container. The corner pieces are further configured so that the lifting notches are substantially hidden and so that the assembly presents an overall very aesthetically pleasing visualization.

Figure 14:
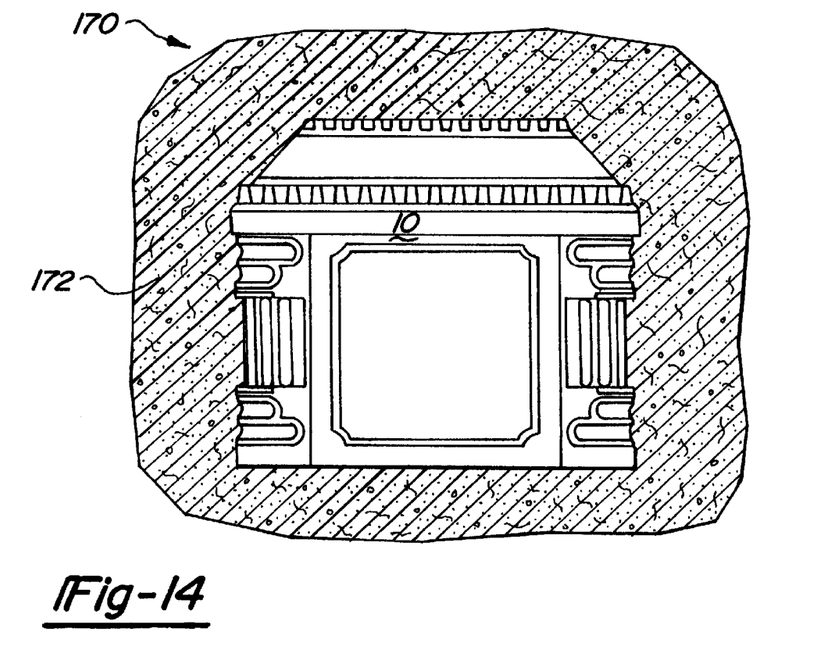
FIG. 14 is an environmental end view similar to that shown in FIG. 13 and further showing the burial container in a second buried stage in which the excavation is completely filled and the negative impressions formed along the sides and top combine with the biasing nature of the foam filled perimeter base to fixedly locate the burial container relative to the surrounding earth.

Referring finally to FIG. 14, a fully assembled and installed view of the burial container assembly 10 is shown buried within the ground and completely surrounded by earth 172. The combination of features previously described are such that the lid and base are constructed of much lighter plasticized and non-corrosive material composition and, upon filling of the foamable filler material within the hollowed interiors of the lid and base and installation of the opposing perimeter edges of the lid and base, will provide greatly increased load bearing and resisting forces within the ground as opposed to much heavier concrete burial vaults which also provide less in the way of water sealing integrity. The construction of the burial container assembly of the present invention is further such that water, which invariably collects around the container within the ground, will not permeate the seal formed between the lid and base and further that the construction of the lid and base will prevent the occurrence of cracks or fractures.

A method of assembling a burial container assembly according to the description previously given is also provided and includes such steps assembling the shell construction of the base, filling both the hollowed interior shells of the lid and base with the foamable filler material, and adhesively securing the opposingly facing perimeter edges of the lid and base together.

Having described my invention, additional operative embodiments will become apparent to those skilled in the art to which it pertains without deviating from the scope of the appended claims.

I claim:

1. A burial container assembly, comprising:
   a lid with a planar top and a plurality of sides extending from said top to define in combination a first downwardly facing perimeter edge, said lid being constructed as a first shell with an inner layer and a spaced apart outer layer to define a first hollowed interior, a portion of said planar top being removed to expose said hollow interior;
   a base with a bottom, side walls and end walls extending from said bottom to define in combination a second upwardly facing perimeter edge surrounding an open interior, said base being constructed as a second shell with an inner layer and a spaced apart outer layer to define a second hollowed interior which is accessible from an underside of said bottom;
   a plurality of vertically extending fluid-filled ballast tubes secured within said second hollowed interior of said base and proximate first, second, third and fourth corners of said base, each of said ballast tubes further including a foot valve located at an open bottom end, said foot valve facilitating one way inflow of ground water surrounding the assembly into said ballast tubes to add weight to said four corners of the assembly by facilitating one-way inflow of water through said foot valves, said volumes of water contributing to immovable support of the assembly;
   securing means for affixing said first downwardly facing perimeter edge of said lid to said second upwardly facing perimeter edge of said base; and
   means for filling said first and second hollow interiors with a filler composition.

2. The burial container assembly according to claim 1, said inner layer of said base further comprising a one-piece rectangular shaped body and an outwardly projecting ledge extending along said inner layer and around a perimeter of said body.

3. The burial container assembly according to claim 2, said spaced apart outer layer of said base further comprising a plurality of individual and assembleable planar shaped pieces which are arrayed in combination around said rectangular shaped body and are securably attached in end to end fashion to each other and to said outwardly projecting ledge.

4. The burial container assembly according to claim 3, said plurality of individual and assembleable planar shaped pieces of said spaced apart outer layer of said base further comprising a first side piece, a second end piece, a third side piece and a fourth end piece arranged in rectangular and opposing fashion around said rectangular shaped body, a plurality of first, second, third and fourth corner pieces being arranged at associated corner locations between said side and end pieces.

5. The burial container assembly according to claim 4, further comprising a plurality of two-sided adhesive strips which are secured along both side edges and top edges of said side pieces, end pieces and corner pieces for assembling said pieces in end to end fashion and also to said outwardly projecting ledge.

6. The burial container assembly according to claim 5, further comprising exterior facing surfaces of said corner pieces of side pieces of said base having formed therein a plurality of negative impressions.

7. The burial container assembly according to claim 1, said securing means for affixing said downwardly facing perimeter edge of said l id to said upwardly facing perimeter edge of said base further comprising an applied adhesive.

8. The burial container assembly according to claim 1, said means for filling said first and second hollowed interior with a filler composition further comprising a nozzle for introducing a foamable plasticized material.

9. The burial container assembly according to claim 8, said foamable filler material further comprising an aggregate additive.

10. The burial container assembly according to claim 1, further comprising opposingly facing surfaces of said inner layers and said outer layers of said lid and base which make up said first and second hollowed interiors further including sheets of planar shaped adhesive material being applied thereto for evenly securing said filler composition.

11. A burial container assembly, comprising:

a lid with a top and a plurality of sides extending from said top to define in combination a first downwardly facing perimeter edge, said lid being constructed as a first shell with an inner layer and a spaced apart outer layer to define a first hollowed interior, a portion of said top being removed to expose said hollow interior;

a base with a bottom, side walls and end walls extending from said bottom to define in combination a second upwardly facing perimeter edge surrounding an open interior, a plurality of first, second, third and fourth corner pieces being arranged at associated corner locations between said side walls and said end walls, said base being constructed as a second shell with an inner layer and a spaced apart outer layer to define a second hollowed interior which is accessible from an underside of said bottom, a plurality of exterior facing surfaces of said outer layer of said base each further including pluralities of negative impressions formed therein for contributing to fixed and immovable location of the container assembly within surrounding earth by increasing a surface area of contact therebetween, said negative impressions further including vertically and horizontally extending recessed channels provided along outer faces of said side walls and end walls, said negative impressions further including upper and lower recess channel impressions formed proximate to upper and lower ends of each of said corner pieces;

securing means for affixing said first downwardly facing perimeter edge of said lid to said second upwardly facing perimeter edge of said base; and means for filling said first and second hollow interiors with a filler composition.

12. A burial container assembly, comprising:

a lid with a top and a plurality of sides extending from said top to define in combination a first downwardly facing perimeter edge, said lid being constructed as a first shell with an inner layer and a spaced apart outer layer to define a first hollowed interior, a portion of said top being removed to expose said hollow interior;

a base with a bottom, side walls and end walls extending from said bottom to define in combination a second upwardly facing perimeter edge surrounding an open interior, said base being constructed as a second shell with an inner layer and a spaced apart outer layer to define a second hollowed interior which is accessible from an underside of said bottom;

said inner layer of said base further including a one-piece rectangular shaped body and an outwardly projecting ledge extending along said inner layer and in continuous fashion around said side walls and said end walls to define a perimeter of said body, said spaced apart outer layer of said base being constructed by a plurality of individual and assembleable planar shaped pieces which are arrayed in combination around said rectangular shaped body and are securably attached in end to end fashion to each other and along said outwardly projecting ledge, said plurality of individual and assembleable planar shaped pieces including a first side piece, a second end piece, a third side piece and a fourth end piece arranged in rectangular and opposing fashion around said rectangular shaped body, a plurality of first, second third and fourth corner pieces being arranged at associated corner locations between and interconnecting said side and end pieces, said exterior facing surfaces of said corner pieces and said side pieces of said base having formed therein a plurality of negative impressions;

a plurality of two-sided adhesive strips secured along both side edges and top edges of said side pieces, end pieces and corner pieces for assembling said pieces in end to end fashion and also to said outwardly projecting ledge;

securing means for affixing said first downwardly facing perimeter edge of said lid to said second upwardly facing perimeter edge of said base; and means for filling said first and second hollow interiors with a filler composition.

\* \* \* \* \*